United States Patent [19]

Isozaki

[11] Patent Number: 4,787,002
[45] Date of Patent: Nov. 22, 1988

[54] MAGNETIC HEAD HAVING A READ/WRITE COIL WITH A D.C. CURRENT THROUGH IT FOR CANCELLATION OF LEAKAGE MAGNETIC FLUX FROM ERASE COIL

[75] Inventor: Shin Isozaki, Kamakura, Japan

[73] Assignee: Mitsubishi Denki Kabushiki Kaisha, Tokyo, Japan

[21] Appl. No.: 97,419

[22] Filed: Sep. 15, 1987

Related U.S. Application Data

[63] Continuation of Ser. No. 721,816, Apr. 10, 1985, abandoned.

[30] Foreign Application Priority Data

Apr. 12, 1984 [JP] Japan .................................. 59-73174
Apr. 12, 1984 [JP] Japan .................................. 59-73175

[51] Int. Cl.[4] .......................... G11B 5/127; G11B 5/03; G11B 5/147; G11B 5/17
[52] U.S. Cl. ...................................... 360/118; 360/66; 360/123; 360/126
[58] Field of Search ............... 360/118, 119, 123, 124, 360/125, 126, 110, 111, 66, 62

[56] References Cited

U.S. PATENT DOCUMENTS 4,680,657  7/1987  Naito ..................................... 360/66

FOREIGN PATENT DOCUMENTS

| 0175800 | 4/1986 | European Pat. Off. ............ 360/110 |
| 56-87215 | 7/1981 | Japan ..................................... 360/126 |
| 57-98124 | 6/1982 | Japan ..................................... 360/125 |
| 58-64609 | 4/1983 | Japan ..................................... 360/66 |
| 58-125220 | 7/1983 | Japan ..................................... 360/125 |
| 59-139120 | 8/1984 | Japan ..................................... 360/126 |
| 59-229703 | 12/1984 | Japan ..................................... 360/66 |

OTHER PUBLICATIONS

IBM Technical Discl. Bull., vol. 18, No. 9, Feb. 76, pp. 3004–3005, "Single-Gap Head for Record and Tunnel Erasing", by A. J. Bowen.

*Primary Examiner*—Stuart N. Hecker
*Assistant Examiner*—Alfonso Garcia
*Attorney, Agent, or Firm*—Armstrong, Nikaido, Marmelstein & Kubovcik

[57] ABSTRACT

A magnetic disk drive apparatus is disclosed including a read and write head having a read and write coil and an erase head having an erase coil at the opposite sides of the read and write head for erasing data at the both sides of the written data track, the improvement includes a leakage magnetic flux cancelling coil wound on the read and write head which is energized with a d.c. current for cancelling the leakage magnetic flux from the erase head when the erase coil is energized with a d.c. current.

2 Claims, 5 Drawing Sheets

PRIOR ART

MAGNETIC HEAD HAVING A READ/WRITE COIL WITH A D.C. CURRENT THROUGH IT FOR CANCELLATION OF LEAKAGE MAGNETIC FLUX FROM ERASE COIL

This application is a continuation of application Ser. No. 721,816 filed Apr. 10, 1985, now abandoned.

BACKGROUND OF THE INVENTION

The present invention relates to a magnetic disc drive apparatus having a read/write head and an erase head and in particular to a magnetic flexible disc drive apparatus in which unwanted influence on the read/write head due to leakage magnetic flux from the erase head is reduced.

FIG. 1 shows a first prior art tunnel erase type magnetic head in a flexible disc drive apparatus.

A read/write head 1 comprises a core assembly including a pair of cores 3 opposing each other with a read/write head gap 2, a bridging bar 5 which bridges both cores 3 and 3 to form a magnetic path and a read/write coil 6 wound on one of the cores 3. The coil 6 is adapted to be energized with a write current IW.

The erase head 7 is spaced from the read/write head 1 by a distance of d1. The erase head 7 comprises a pair of core assemblies 8 opposing each other with a space equal to the width of the core 3 so that the center axis between the cores 8 is aligned with the cores 3 and an erase coil 9 wound on the core assembly 8. The erase coil is adapted to be energized with a d.c. current Ie to build a d.c. magnetic field. Each core assembly 8 includes a bridge bar 12 which bridges both cores 11 opposing each other with an erase gap 10.

In the first prior art magnetic disc drive apparatus which is constructed in such a manner, data is stored on the magnetic disc 24 by the read/write head 1 to form a data stored track AW by rotating the magnetic disc in a direction as shown by an arrow A in FIG. 2. The magnetic disc at both sides of the data stored track A is erased by the erase head 7 to form erased tracks Ae. This prevents the read data from deteriorating due to cross talk of previous data even if the position of the read/write head 1 is slightly shifted radially when the stored data is read out.

FIG. 3 shows a second prior art magnetic head in a disc drive apparatus. This magnetic head is characterized in that its formation is simplified by forming an integral erase head 7. This magnetic head in a disc drive apparatus is operated in the same manner as the first prior art apparatus.

In the first and second prior art apparatus, when one block data unit, which is called a sector, is written along one track on the magnetic disc shown radially in FIG. 2, simultaneous conduction of the write current IW and the erase current Ie causes shifts between the written data track zone AW and the erase track zones Ae, Ae because of distance d2 between the read/write head gap 2 and the erase gap 10. Accordingly time delays De1 and De2 are usually provided for the erase current Ie at the beginning and the end of the write operation respectively, as shown in FIG. 4, so that the stored data track AW is sandwiched between the erase track zones Ae, Ae at the both sides Since transition of magnetic field due to turning off of the erase current Ie at the end of the erase delay time De2 induces the generation of noise voltage in the R/W coil 6 on the read/write head 1, it makes it difficult to read the subsequent sector for the interval of the erase delay time De2. Accordingly it is necessary to provide a space at least equal to the length d2 between the adjacent sectors. The length d2 should be as short as possible to efficiently use tracks on the magnetic disc 24. The common integration of the core 3 of the read/write head 1 and the core 11 of the erase head 7 in the third prior art apparatus, as shown in FIG. 5, has been proposed in order to provide a decreased length d2.

Decreasing the length d2 however involves disadvantages in that the fabrication of cores is difficult due to small size of core as well as the fact that the d.c. magnetic field of the erase head 7 is readily coupled with the read/write head to provide the recorded wave form on the disc with asymmetry. The term asymmetry means the difference in the length of magnetized region on the magnetic disc, even if a write current which is positively and negatively symmetrical is applied. This lowers the read margin of the data since the peak position is shifted on reading.

The length d2 is usually in the order of 0.9 mm. The increase in ampere turn of the erase coil 9 for the enhancement of the erasure efficiency of the erase head under such length d2 may involve the same disadvantages.

SUMMARY OF THE INVENTION

It is therefore an object of the present invention to provide a magnetic disc drive apparatus in which unwanted influence on the read/write head due to the leakage magnetic flux from an erase head is reduced. In one aspect of the present invention there is provided a magnetic disc drive apparatus including a read and write head having a read and write coil and an erase head having an erase coil positioned at the opposite sides of the read and write head for erasing data at the both sides of the written data track, the improvement comprising a leakage magnetic flux cancelling coil wound on the read and write head which is energized with a d.c. current for cancelling the leakage magnetic flux from the erase head when the erase coil is energized with a d.c. current.

The read and write head may comprise a pair of cores which oppose each other with a gap and a bar for bridging the cores. The leakage magnetic flux cancelling coil maybe wound on the bridge bar.

The cancelling coil may be a small part of the read and write coil on the read and write head, applying full erase current.

The cancelling coil may also be between one end and the center tap of the read/write coil, applying small current during the erase head is energized.

In accordance with the time the present invention a leakage magnetic flux cancellation coil is energized for generating such a magnetic flux that it cancels the leakage magnetic flux on the read/write head induced from an erase head. Accordingly unwanted influence on the read/write head due to leakage, magnetic flux may be reduced.

DETAILED DESCRIPTION OF THE PREFERRED EMBODIMENTS

Figure 1:
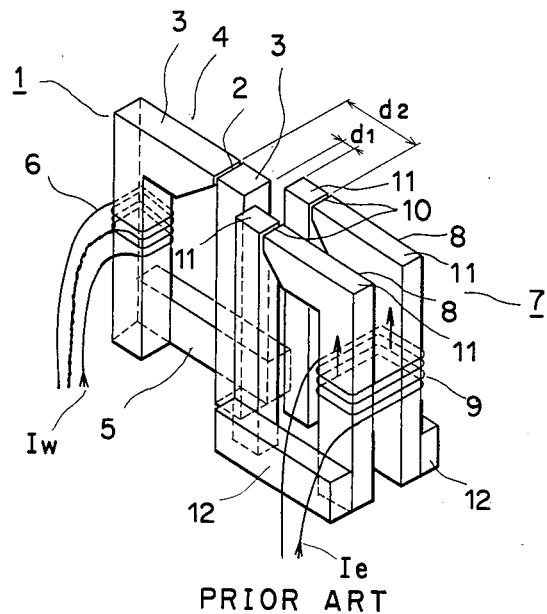
FIG. 1 is a perspective view showing a first prior art magnetic head on a disc drive apparatus.
Figure 5:
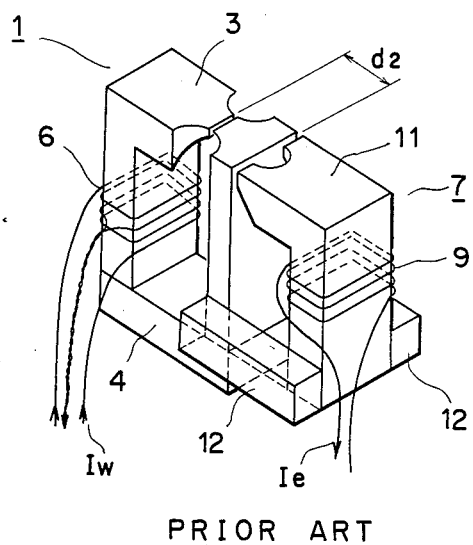
FIG. 5 is a perspective view showing a third prior art magnetic head on a disc drive apparatus.
Figure 2:
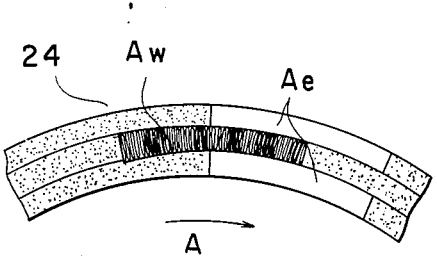
FIG. 2 is a schematic view showing a partial disc bearing a data stored track and erase track bands at the both sides of the data stored track.

The embodiments of the present invention will be described with reference to the drawings. The components which are the same as those of the first prior art apparatus are designated with like reference numerals and the description thereof is omitted herein.

Figure 6:
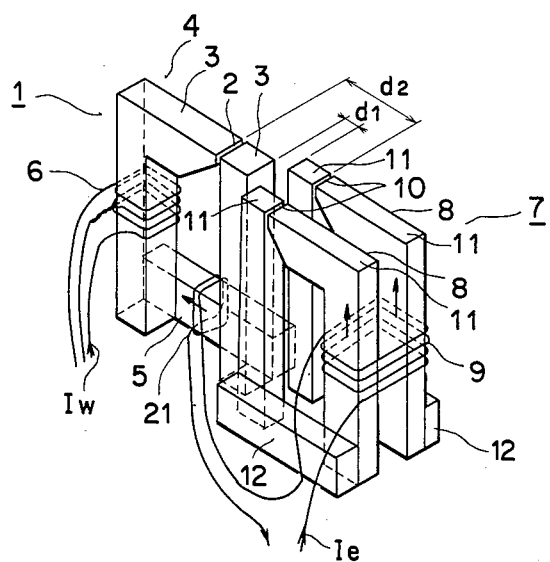
FIG. 6 is a perspective view showing a first embodiment of a magnetic head on a disc drive apparatus of the present invention.

In FIG. 6 a leakage magnetic flux cancellation coil 21 is wound on a bridge bar 5 of a core 3 forming a read/write head 1 and is connected in series with an erase coil 9. The coil 21 can cancel the leakage magnetic flux from the erase coil 9 to the read/write head if the number of the turns of the coil 21 is properly adjusted.

The magnetic disc drive apparatus of the present invention is constructed in such a manner. The operation thereof will be described.

At the erase gap 10 the d.c. magnetic field generated from the erase coil 9 does not only erase the data at the both sides of the data track on the magnetic disc, but also will give magnetic influence upon the cores 3 of the read/write head by the leakage flux. In accordance with the present invention, d.c. current also conducts through the leakage magnetic flux cancellation coil 21 so that the magnetic flux generated from the coil 21 can cancel the leakage magnetic flux. As a result, the cores 3 of the read/write head 1 generate a magnetic field in response to inherent write current IW, enabling a write operation to be performed with reasonable symmetry in the positive and negative length of the magnetized region.

Figure 3:
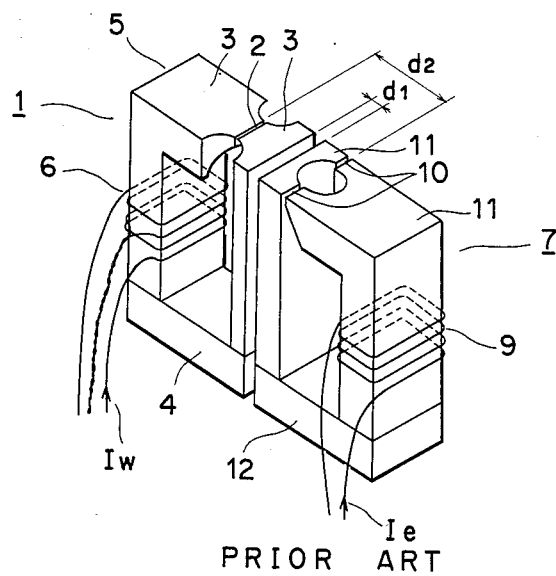
FIG. 3 is a perspective view showing a second prior art magnetic head on a disc drive apparatus.
Figure 4:
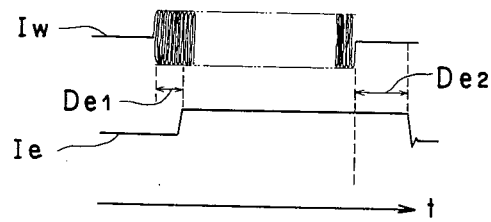
FIG. 4 is a time chart showing a write signal and erase current.
Figure 7:
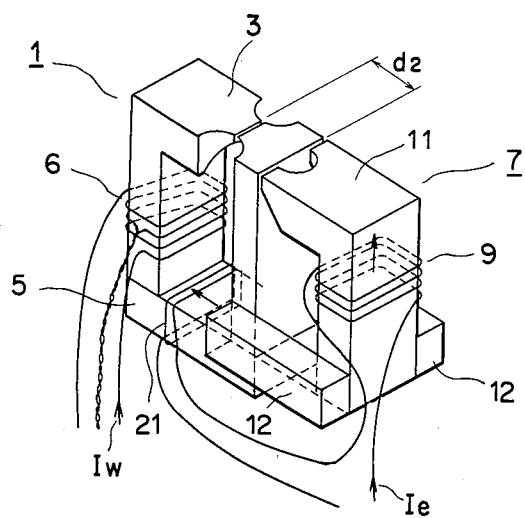
FIGS. 7, 8 and 9 are perspective views showing second, third and fourth embodiments of the magnetic head on a disc drive apparatus of the present invention respectively.

FIG. 7 shows a second embodiment of the present invention. The parts which are identical with those of second prior art apparatus shown in FIG. 3 are designed with like reference numerals. This embodiment is characterized in that a leakage magnetic flux cancellation coil 21 is wound on the bridge bar 5 of the read/write magnetic head.

Although all the erase current Ie is caused to flow through the leakage magnetic flux cancellation coil 21 in the aforementioned embodiments, the apparatus may include a current dividing circuit and switch means for adjusting the number of turns of the coil for the purpose of compensating for the variations of head characteristics, etc.

Although the embodiments of the present invention have been described in connection with a head for a tunnel erase type flexible disc apparatus, the present invention is similarly applicable to a straddle erase head in which the erasing magnetic field is normal to the R/W head gap or applicable to a head in which the erase gap is inclined to the R/W head gap at an angle from 0° to 90°.

Figure 8:
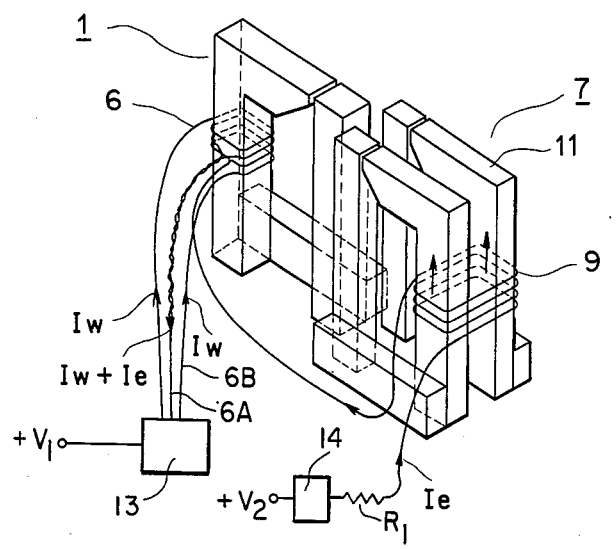

The read/write coil 6 maybe provided with an auxiliary tap in addition to center tap 6A as shown in FIG. 8. A d.c. current may be caused to flow between the auxiliary tap and the center tap of the coil 6 for cancelling the leakage magnetic flux from the erase head 7 as in FIG. 8.

Figure 9:
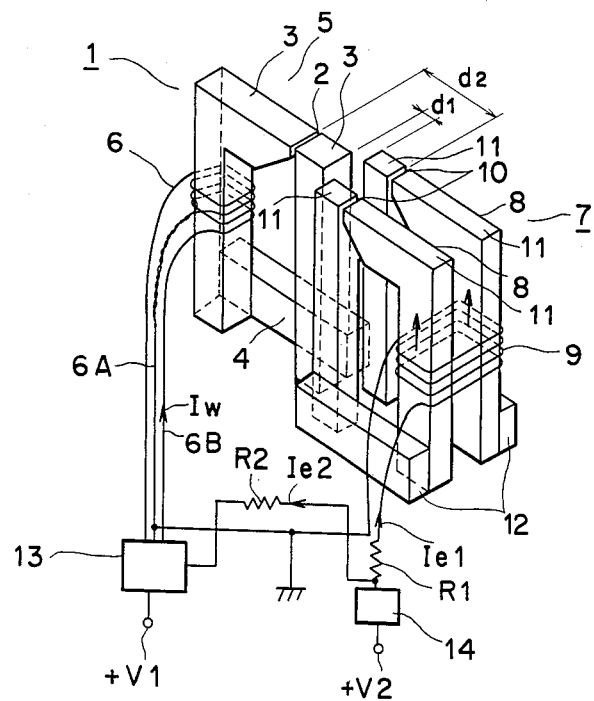

FIG. 9 shows a fourth embodiment of the flexible disc drive apparatus of the present invention. The magnetic disc drive apparatus comprises a read/write head 1, an erase head 7, a read/write amplifying circuit 13 and erase switch circuit.

The read/write head 1 comprises a core assembly 5 including a pair of cores 3 and a bridge rod 4 which bridges both cores 3 and a read/write coil 6, through which a write current IW flows.

The erase head 7 which is apart from the read/write 1 by a distance d1 comprises a pair of core assemblies 8 which oppose each other with a gap equal to the width of the core, the core 3 being aligned with the center axis between the core assemblies 8 and an erase coil 9 wound on the core assemblies 8 and through which an erase current Ie flows. Each core assembly 8 includes cores opposing each other with an erase gap 10 and a bridge rod 12 which bridges the cores 11 for forming a magnetic path.

The read/write amplifying circuit 13 which is connected with the read/write coil 6 amplifies read/write signals. The erase switch circuit 14 which is connected with the erase coil 9 via the resistor R1 is adapted to energize or deenergize the erase head 7 by turning on or off, whereby the data stored track in which the data is written by the read/write head 1 is erased at the both sides thereof with a d.c. magnetic flux.

Figure 10:
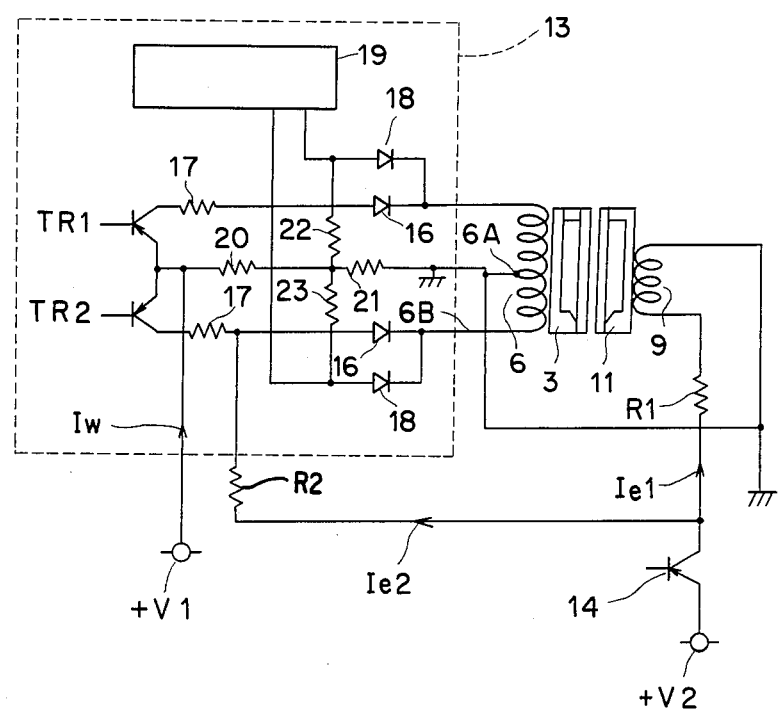
FIG. 10 is a circuit diagram showing a read/write amplifying circuit and the erase switch circuit with the cancelling circuit of the fourth embodiment of the present invention.

FIG. 10 shows the structure of the read/write amplifying circuit 13 and the erase switch circuit 14 in more detail. A pair of PNP type write amplifying transistors TR1 and TR2, have emitters which are connected with each other and connected with a power supply +V1 and have bases to which write signals are alternatingly applied to alternatingly turn on or off the transistors TR1 and TR2 in write-operation.

Each of diodes 16 has an anode which is connected with the collector of the write amplifying transistors TR1 and TR2 via a resistor 17 and has a cathode which is connected with one end of the read/write coil 6 wound on the core 3. The read/write coil 6 has a center tap 6A which is grounded.

Each of diodes 18 has a cathode connected with one end of the read/write coil 6 in parallel relationship with the diodes 16 and has an anode connected with a read signal amplifier 19.

A voltage is applied from the power supply +V1 to the anodes of the diodes 18 via resistors 20, 21, 22 and 23.

The erase switch circuit 14 comprises a PNP type switching transistor having an emitter connected with a power supply +V2 and a collector connected with the erase coil 9 wound on the cores 11 via a resistor R1.

A resistor R2 is connected between the output of erase switch 14 and terminal 6B of the read/write coil 6 via diode 16 so that the d.c. current from the power supply +V2 is supplied to the center tap 6A from terminal 6B. The resistor R2 forms a cancelling current feeder circuit.

The erase current supplied to the erase coil 9 is represented as follows:

$$Ie1 = V2/R1$$

While the erase switch circuit 14 is turned on, the current Ie2 ($Ie2 = V2/R2$) is superposed across one terminal 6B and the center tap of the read/write coil 6. Accordingly the magnetic flux due to the current Ie2 can cancel the leakage magnetic flux generated from the erase head 7. Since the current superposed on the read/write coil 6 is very small, it will not interfer with the write-operation. When the write-operation is carried out, transistors TR1 and TR2 are alternatingly turned on in response to the write information to conduct the write current IW through the read/write coil 6 via diodes 16. When the erase switch circuit 14 is rendered conductive, one half of the read/write coil 6 is energized with a current flowing via the resistors R2 and the diode 16 so that the core 3 is d.c. magnetized for cancelling the leakage magnetic flux from the erase coil 9. In read-operation, the write amplifying transistors TR1, TR2 and erase switch circuit 14 are non-conductive and the diodes 18 are rendered conductive by the very small current supplied from the power supply +V1 via the resistors 20, 21, 22 and 23 so that the read signal of the read/write coil 6 is amplified by the signal amplifier 19. As described above, the cancellation current, or the dc current through resistor R2 and diode 16, is not applied in the read operation.

Although the compensation for the leakage magnetic flux due to the erase current supplied to the erase head in the disc drive apparatus having a structure shown in FIGS. 6 and 8 has been described in the above embodiment, it is apparent that this current compensation is applicable to other erase-read/write combination heads having any head structure. Furthermore, one way of conducting the cancellation current to the read/write coil 6 is shown in FIGS. 9 and 10, however, other arrangements may, of course, be possible.

What is claimed is:

1. A magnetic head for use in a magnetic disc drive apparatus for performing read/write operations, said magnetic head comprising:
    a read/write head having a read/write coil with a center tap to divide said read/write coil into a first section and a second section;
    an amplifying circuit means for supplying a write current through said read/write coil in accordance with data to be written during a write mode, said write current including a first write current flowing through said first section and a second write current flowing through said second section, said first write current flowing alternately with said second write current and in an opposite direction;
    an erase head having an erase coil through which an erase current flows during said write mode for erasing on both sides of a data track written by said read/write head, said erase head causing a magnetic leakage flux in an opposite direction to a magnetic flux set up by said first write current;
    an erase switch circuit means provided in series with a DC voltage source and said erase coil, said erase switch circuit means being closed during said write mode for supplying said erase current and for causing a DC current therefrom to flow through said first section in the same direction as said first write current, such that said DC current generates a magnetic flux in an opposite direction to said magnetic leakage flux caused by said erase head in said read/write head, thereby cancelling out said magnetic leakage flux.

2. The magnetic head of claim 1, wherein said first section is provided with an auxiliary tap therein, and said erase current flowing out of said erase coil is supplied to said first section via said auxiliary tap as said DC current.

* * * * *